INVENTORS
FREDERICK W. SCHNEBLE, JR.
JOHN F. McCORMACK
RUDOLPH J. ZEBLISKY
JOSEPH POLICHETTE
BY
Morgan, Finnegan, Durham & Pine
ATTORNEYS.

INVENTORS
FREDERICK W. SCHNEBLE, Jr.
JOHN F. McCORMACK
RUDOLPH J. ZEBLISKY
JOSEPH POLICHETTE
BY
MORGAN, FINNEGAN, DURHAM & PINE
ATTORNEYS

United States Patent Office 3,146,125
Patented Aug. 25, 1964

3,146,125

METHOD OF MAKING PRINTED CIRCUITS

Frederick W. Schneble, Jr., Oyster Bay, John F. McCormack, Roselyn Heights, Rudolph J. Zeblisky, Wyandanch, and Joseph Polichette, South Farmingdale, N.Y., assignors, by mesne assignments, to Day Company, N.V., a Curacao corporation Filed May 31, 1960, Ser. No. 33,361
5 Claims. (Cl. 117—212)

Figure 1:
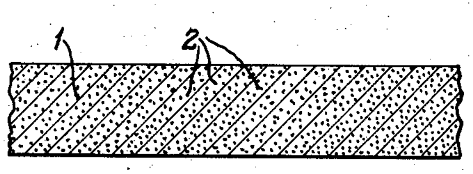

The present invention relates to a novel and improved method of making printed circuits on insulating supports and to the products which result from each method. More particularly the present invention relates to a method for improving the insulating properties of at least a portion of a printed circuit support by including in it finely divided particles of cuprous oxide and the treatment of certain portions of said cuprous oxide to change it to a conducting circuit.

The present case is a continuation-in-part of our copending application Serial No. 831,407, filed August 3, 1959, for Method of Making Printed Circuits, and now abandoned.

Objects and advantages of the invention will be set forth in part herein and in part will be obvious herefrom or may be learned by practice with the invention, the same being realized and attained by means of the instrumentalities and combinations pointed out in the appended claims.

The invention consists in the novel parts, constructions, arrangements, combinations and improvements herein shown and described. The accompanying drawings referred to herein and constituting a part hereof, illustrate embodiments of the invention and together with the invention serve to explain the principles of the invention.

Conventional methods of the production of printed circuits rely upon the deposition of the circuit of various means either initially on a backing from which it may ultimately be separated and placed on a supporting surface or by preparing a supporting surface in such a way that it will receive the design of the circuit thereon. The difficulty with the two general types of method now conventionally used for production of printed circuits is that the first method is somewhat time consuming and requires great care in the proper transfer of the circuit from the backing to the support. It also does not lend itself to the production of miniaturized electrical components in which the circuit itself would be of extremely fine design. The second method is usually accomplished by printing on an insulating backing the design of the circuit by means of various inks containing receptive particles which then have the conductive material from which the circuit is to be made electrolessly deposited thereon. The electroless deposition step may be followed by an electrolytic deposition step to build up the thickness of the circuit. A major problem encountered here is a circuit which might be interrupted because the strength of the bond between the printed circuit and the insulating base is sometimes not sufficiently strong to withstand extremes of vibration or the sudden shock of extreme thermal variations.

It is an object of the present invention to provide a printed circuit which adheres tenaciously to its insulating support member and which is capable of an extreme degree of miniaturization.

Another object of the present invention is the provision of a method for making printed circuits which permit the production of extremely adherent circuit designs and also increases the insulating properties of the base upon which such design is applied.

Objects and advantages of the invention will be set forth in part hereinafter and in part will be obvious herefrom, or may be learned by practice with the invention, the same being realized and attained by means of the instrumentalities and combinations pointed out in the appended claims.

It has been found in the present invention that the objects mentioned above may be accomplished by using cuprous oxide incorporated in various ways onto or into the insulating base member of the printed circuit. Cuprous oxide is itself an exceptionally good insulator of electricity. Cuprous oxide when operated upon by the steps of the method of the present invention may be changed to metallic copper and initially form the conducting portion of the desired printed circuit design which may be further built up by electroless deposition, electrolytic deposition or a combination of the two.

The following figures are included to illustrate the major embodiments of the present invention.

Figure 2:
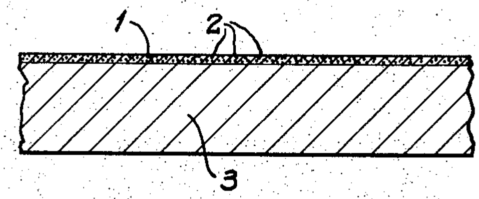
Figure 3:
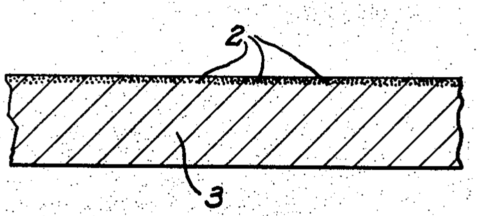
Figure 4:
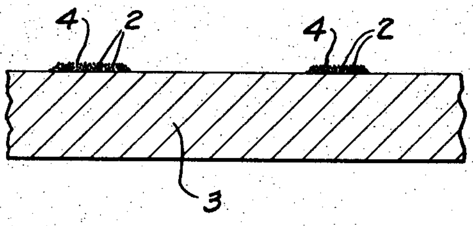

FIGURE 1 shows an insulating base 1 which has randomly distributed throughout it particles of cuprous oxide 2, FIGURE 2 shows an insulating support 3 to which there has been laminated an insulating base 1 in which there is randomly distributed particles of cuprons oxide 2, FIGURE 3 shows an insulating support 3 the upper surface of which has incorporated into it finely divided particles of cuprous oxide 2, and FIGURE 4 shows an insulating support 3 having applied on its surface particles of cuprous oxide 1 in the form of filler in an adhesive ink 4.

Figure 5:
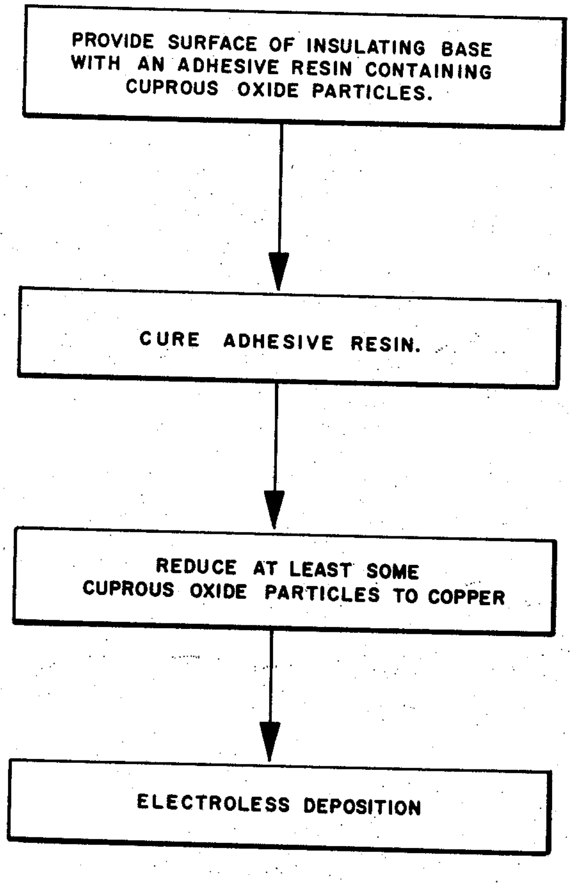

FIGURE 5 is a flow diagram of the process used to carry out the invention.

The insulating base members contemplated for use in the present invention are most often formed of resinous material. The copper oxide which is used in finely divided form may be incorporated into the resin by milling, calendering or other conventional methods after which the resin is set. Alternatively only a layer of unpolymerized resin having cuprous oxide resin particles suspended in it might be laminated to a resinous insulated base and cured thereon.

Another method of providing cuprous oxide would be to apply particles of cuprous oxide to the uncured surface of a tacky resin and then cure it. Lastly an ink containing adhesive material as well as finely divided cuprous oxide might be printed on the surface of a resinous insulating support and ultimately cured thereon.

An insulating support base prepared in any of the ways described above, having on at least one surface thereof cuprous oxide particles, preferably passing 200 mesh or finer, is covered by a resist or reverse printed with ink which cannot be electrolessly deposited upon so that the only bare area traces the circuit design desired to be produced. The surface bearing the resist or reverse ink image is treated with sulphuric acid or other reducing acid. This step results in the production of metallic copper. The surface is then rinsed thoroughly and immersed in an electroless plating bath which may deposit copper, nickel or the like to build up the circuit. The circuit may be further built up by the attaching of an electrode to it and electrolytically depositing more of the desired metal on it.

The cuprous oxide used in the present invention is in finely divided form such that it will pass 200 mesh or greater. The cuprous oxide particles are incorporated into the resin with which they are to be used by milling, calendering or similar methods of incorporation until 0.25% to 80% of the weight of the combined resin and cuprous oxide is cuprous oxide. This same weight ratio is true where the cuprous oxide is applied to surface lamina which is bonded to the insulating base. Where the upper limit of the range of copper particles is used only negligible amounts of resin will coat the uppermost particles. In this situation they are readily reached by the acid which is used to convert the cuprous oxide at least in part to metallic copper. At the lower end of the indicated range it may sometimes be necessary to lightly abrade the surface which is to be treated with the acid in order that the acid not be prevented from reaching the cuprous oxide by an overly thick coating of resin. Although the abraded surface is receptive to the electroless deposition of copper it must be exposed to the electroless plating bath from 2 to 4 hours before the initial copper deposit forms.

In the latter case the abrading must occur before the masking of the portions of the insulating support which are to remain bare of conductor material since otherwise the masking resist or ink would be disturbed or destroyed by the abrading process. The resist or masking ink may, where desirable, be dry, baked, cured or the like, in order to permanently set it in that position. The panel prepared in this manner is then contacted with an acid which will reduce the cuprous oxide to metallic copper at least in part. The acid treated surface is then rinsed and immersed in an electroless plating bath from which it may obtain copper, nickel or other metal. The time lapse between the acid treat and the electroless deposition is preferably a short one since some of the metallic copper exposed to the atmosphere will itself become oxidized again lessening the number of active sites which readily accept the electroless deposition. The circuit formed by the electroless deposition can be built up further by attaching an electrode to the printed circuit and electroplating it further by conventional methods.

The electroless deposition of the present invention begins eight times faster than is usual in conventional electroless deposition processes. The resultant deposition of metal is smoother, more uniform and more adherent than is obtained in conventional processes which omit the reducing step with an acid. Sulphuric acid is the preferred acid for reducing the cuprous oxide to copper but other acids which are acceptable are phosphoric acid, acetic acid and hydrofluoric acid. Nitric acid may also be used but it is not quite as desirable as the others since it dissolves the copper formed at a rather high rate. The other halogen acids are not used since copper halides tend to form rather than metallic copper.

*Example I*

An insulating base is formed by uniformly mixing 155 grams of Ciba 502 which is the reaction product of bisphenol A and epichlorohydrin which has a viscosity of 4500 centipoises and an epoxy equivalent of 0.38 and adding to it an equal weight of cuprous oxide which passes 200 mesh and milling with the pulverulent copper oxide particles for 1 to 2 minutes, which makes for a mixture which is relatively uniform. This uniform mixture is ready for immediate use or may be set aside for later use. It has an amine hardener, in this case 70 grams of diethylene triamine blended with it by constant turning, cutting and rubbing for about 2 minutes. It is then transferred to a mold by means of which it is given the shape desired. Heat may be applied to speed setting of the epoxy resin loaded with cuprous oxide particles so that the reaction is complete in a period of about 1 hour.

One surface of the insulating base thus formed is provided with a resist, portions of which have been removed, said portions marking out the circuit design which it is desired to form. An aqueous solution of 30° Baumé sulphuric acid is then applied to the resist covered surface. The strength of the acid is not particularly critical an acid strengths from 5° to 40° Baumé have proven quite acceptable. The acid is allowed to remain in contact with the resist covered surface for 10 minutes. Contact of from 5 to 15 minutes is the usual period of time in which the cuprous oxide particles which are unprotected by the resist are reacted upon by the acid and converted to metallic copper. The acid is then removed by a thorough rinsing and the insulating base is then immersed in a conventional bath for the electroless deposition of a metal such as copper or nickel and as a result the circuit becomes further built up. Where a particularly well defined, heavy circuit is desired an electrode may be attached to the area of electrolessly deposited copper and conventional electrolytic deposition of copper carried out until the desired thickness is attained.

*Example II*

Since only the surface portion of the insulating base is acted upon during the contact with the acid it has proven desirable in some cases to take a cuprous oxide loaded resin and coat the surface of an insulating support with a lamina of such a composition and cure it thereon. A coating of epoxy-resin-cuprous oxide as described in Example I is applied to a clean urea-formaldehyde resin support to a depth of about 1/64 of an inch and cured thereon. This depth may be varied on either side of that used here but 1/16 of an inch is the most useful for any practical purpose. After curing this lamina thereby bonding it to the insulating base substance, the other steps of the process masking, developing with acid and electrolessly plating are carried out as before.

*Example III*

Further alternative to the two methods of providing imbedded cuprous oxide particles on which to operate to form a printed circuit a resinous composition may be formed, placed in a mold and while still tacky prior to its final set or cure, a dusting or covering of its surface with a layer of cuprous oxide particles passing about 200 mesh is applied and tightly bonded thereto by completing the cure. Such a resin is formed by taking 100 grams of vinyl chloride-vinyl acetate copolymer (vinylite resin VYNS), mixing with dioctyl phthalate plasticizer 40 grams and methyl ethyl ketone 150 grams, placing such mixture in a mold and applying the cuprous oxide particles to it while still tacky. When the insulating base is supplied with cuprous oxide in this manner the circuit is best formed by reverse printing on the cuprous oxide covered surface with a masking ink composition which covers all the cuprous oxide surfaces which are not to form part of the printed circuit. The reduction of cuprous oxide is accomplished as before by using an acid of from 5 to 50% strength. The building up of the circuit is accomplished using conventional methods. The use of an organosol as the matrix in which to embed the cuprous oxide particles permits the production of bases having a wide variety of flexibility, tensile strength, deformability and the like.

*Example IV*

Another variation of this invention is the provision of cuprous oxide in an adhesive resin-based ink which may be printed directly on an insulating base support such as methyl methacrylate. A suitable ink formulation for use in this embodiment is made up by weight as follows:

| | Parts |
|---|---|
| Phenol-formaldehyde resin (alcohol soluble) | 60 |
| Polyvinyl butyral resin | 40 |
| Ethanol | 100 |
| Cuprous oxide (powder, pass 200 mesh) | 150 |
| Powdered silica (methyl isobutyl ketone), sufficient to adjust viscosity to about 200 poises. | |

The resin-based ink circuit thus outlined is cured, bonding it to the resin insulating base. The cuprous oxide particles are reduced to metallic copper by means of contacting the cured resin based ink containing cuprous oxide particles with an acid and building up the circuit in the same manner as in the previous example.

*Example V*

An adhesive containing a small amount of copper oxide ($Cu_2O$) is prepared as follows:

| | | |
|---|---|---|
| Butadiene-acrylonitrile copolymer[1] | parts by weight | 23 |
| Phenol-formaldehyde resin[2] | parts | 10 |
| Zirconium silicate | do | 107 |
| Silica (20$\mu$) | do | 4 |
| Cuprous oxide | do | 0.5 |
| Isophorone | do | 90 |
| Xylene | do | 31 |

[1]Medium high acrylonitrile content, Paracril C.V.
[2]Combination of 5 parts oil soluble, heat reactive, solid resin, M.P. 144–162° F., sold by Schenectady Varnish Co. as SP–103, and 5 parts alcohol soluble, oil soluble, heat reactive, solid resin sold by Schenectady Varnish Co. as SP–126, M.P. 150–165° F.

The rubber is dissolved in part of the solvent and the phenolic resin dissolved separately in the rest of the solvents. The two solutions, cuprous oxide and the pigments are blended in a three roll paint mill. The circuit design is screen printed on an epoxy-glass laminate and cured. The cured print of the circuit is immersed in 20° Baumé sulfuric acid solution for ten minutes. It is then removed, washed free of sulfuric acid and immersed in a conventional electroless plating bath. A thin copper film covered the circuit after four hours. The thickness of the circuit was then increased by conventional electroplating.

*Example VI*

A molding composition containing 10% cuprous oxide is prepared as follows:

| | Parts |
|---|---|
| (1) Epoxy resin (reaction product of bisphenol A and epichlorohydrin having an epoxide equivalent of 180 to 200 and an average molecular weight of 350 to 400) | 30 |
| (2) Cuprous oxide | 10 |
| (3) Polyamide resin (having an amine value of 210 to 230, the condensation product of dimerized or trimerized fatty acids with aryl or alkyl polyamines) | 60 |
| (4) Zirconium silicate | 97 |
| (5) Silica (20$\mu$) | 4 |

The epoxy resin, cuprous oxide and pigments are blended together in a three roll paint mill, the polyamide resin was warmed until readily workable and blended with the mixture from the mill by constant turning, cutting and rubbing for five minutes. The mix was cast in a mold and cured at 250° F. for forty-five minutes. The fabrication of the printed circuit was carried out as in Example I. The deposition of the copper film within ten minutes after immersion in the plating bath was completely developed on the circuit.

The particular amounts of cuprous oxide shown as specific examples herein are operable though the preferred amounts for obtaining a rapid electroless deposition while using a reasonable amount of cuprous oxide is between 10 and 20% by weight. The initial copper deposition obtained with these amounts occurs within about 2 to 10 minutes after immersion in the electroless plating bath.

The figures show the products resulting from the carrying out of the methods described in the corresponding examples in the specification in that FIGURE 1 corresponds to Example I, FIGURE 2 corresponds to Example II, FIGURE 3 corresponds to Example III and FIGURE 4 corresponds to Example IV.

The invention in its broader aspects is not limited to the specific steps, methods, compositions and improvements shown and described herein, but departures may be made within the scope of the accompanying claims without departing from the principles of the invention and without sacrificing its chief advantages.

What is claimed is:

1. A process for forming printed circuits which consists essentially of providing an insulating base with at least one surface having adhered thereto by means of an adhesive curable resinous bonding agent finely divided, discrete particles of cuprous oxide at numerous individual sites, the particles of cuprous oxide being present in an amount of between about 0.25 and 80 percent of the combined weight of the adhesive resinous bonding agent and cuprous oxide, and being in the form of $Cu_2O$, curing the adhesive resinous bonding agent to firmly adhere the finely divided particles of cuprous oxide to the surface while retaining the discreteness of the particles and their presence at numerous individual sites, reducing at least a portion of the cuprous oxide particles adhesively bonded to the surface to metallic copper particles, and subjecting the resulting insulating base to an electroless metal deposition bath to electrolessly deposit metal directly on said metallic copper particles.

2. The process of claim 1 wherein the particles of cuprous oxide pass 200 mesh.

3. The process of claim 1 wherein the entire surface of the insulating base is provided with particles of cuprous oxide as recited in claim 1, and wherein said surface is masked to leave a pattern of cuprous oxide exposed prior to treatment with the electroless metal bath.

4. The process of claim 1 wherein only selected portions of the surface of the insulating base in the form of a pattern are provided with particles of cuprous oxide as recited in claim 1.

5. The method of claim 1 wherein the cuprous oxide particles are reduced to metallic copper particles by treatment with an acid.

References Cited in the file of this patent

UNITED STATES PATENTS

| | | |
|---|---|---|
| 1,889,379 | Ruben | Nov. 29, 1932 |
| 2,465,105 | Levi | Mar. 22, 1949 |
| 2,626,206 | Adler et al. | Jan. 20, 1953 |
| 2,730,597 | Podolsky et al. | Jan. 10, 1956 |
| 2,891,033 | Savage | June 16, 1959 |
| 2,993,815 | Treptow | July 25, 1961 |
| 3,031,344 | Sher et al. | Apr. 24, 1962 |

OTHER REFERENCES

National Bureau of Standards Circular 468, Printed Circuit Techniques, November 15, 1947, pages 5, 7, 8, 24.